United States Patent [19]

Garuts

[11] E Re. 29,018

[45] Reissued Oct. 26, 1976

[54] CONTINUOUSLY VARIABLE RESISTANCE ATTENUATOR USING LOSSY TRANSMISSION LINE AND HAVING CONSTANT SIGNAL TRANSIT TIME

[75] Inventor: Valdis E. Garuts, Beaverton, Oreg.

[73] Assignee: Tektronix, Inc., Beaverton, Oreg.

[22] Filed: June 9, 1975

[21] Appl. No.: 585,014

Related U.S. Patent Documents

Reissue of:

[64] Patent No.: 3,740,676
Issued: June 19, 1973
Appl. No.: 239,375
Filed: Mar. 29, 1972

U.S. Applications:

[63] Continuation of Ser. No. 85,678, Oct. 30, 1970.

[52] U.S. Cl. ..... 333/81 A; 323/94 R; 338/216

[51] Int. Cl.[2] ..... H01P 1/22

[58] Field of Search ..... 333/81 R, 81 A; 338/150, 216; 323/74, 81, 94, 96

[56] References Cited

UNITED STATES PATENTS

| | | | |
|---|---|---|---|
| 1,613,423 | 1/1927 | Wegel | 333/81 R X |
| 2,517,180 | 8/1950 | Davis | 333/81 A |
| 2,536,501 | 1/1951 | Hood et al. | 333/81 R |
| 2,539,352 | 1/1951 | Hewlett | 333/81 R X |
| 2,909,736 | 10/1959 | Sommers et al. | 333/81 A |
| 3,657,688 | 4/1972 | Casey et al. | 338/150 |

FOREIGN PATENTS OR APPLICATIONS

| | | | |
|---|---|---|---|
| 804,747 | 11/1958 | United Kingdom | 333/81 R |

*Primary Examiner*—Paul L. Gensler
*Attorney, Agent, or Firm*—Kenneth M. Durk

[57] ABSTRACT

A continuously variable resistance attenuator is described in which the signal conductor of a distortionless lossy transmission line is employed as an attenuation resistance uniformly distributed along such line, and the connection of an output contact is moved along such signal conductor to change the attenuator setting. The transmission line has a plurality of separate shunt resistors of equal value extending between the signal conductor and the ground conductor of the line and uniformly distributed along the line to provide a lossy line of uniform characteristic impedance. The input end of such lossy line is connected to a non-lossy line of the same characteristic impedance, and its other end is terminated in a termination resistor equal to such characteristic impedance. In one embodiment, the lossy transmission line is moved relative to a fixed input contact and a fixed output contact to provide a constant transit time for the signal to pass through the attenuator, due to the fixed distance between such contacts and to reduce the size of the contacts for improved high frequency response. The input contact is provided by a fixed portion of the non-lossy line which engages its movable portion attached to the lossy line to provide a transmission line stretcher of variable length.

16 Claims, 5 Drawing Figures

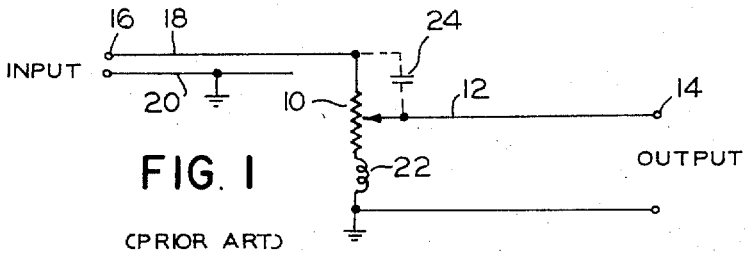
FIG. 1
(PRIOR ART)
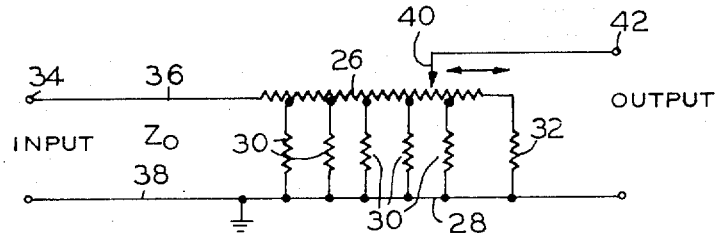
FIG. 2
FIG. 3
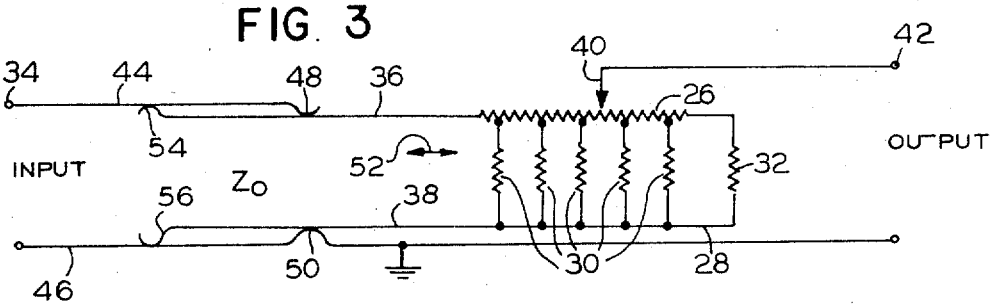
FIG. 5
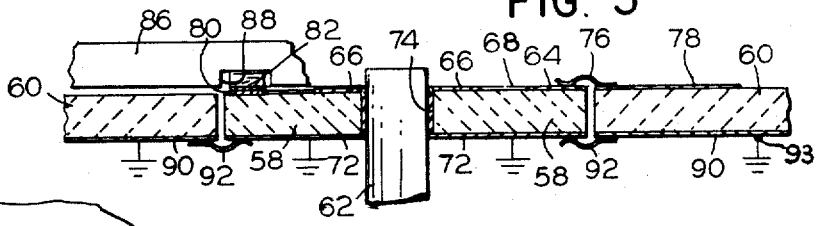
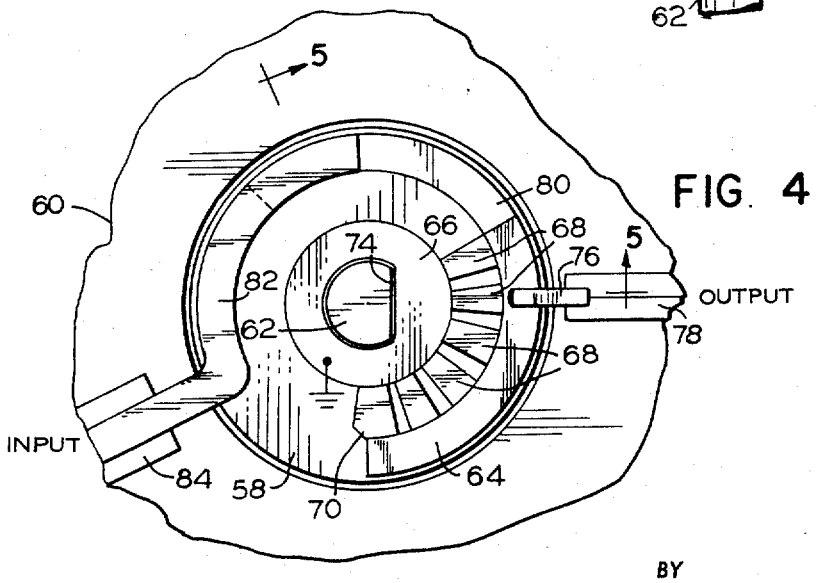
FIG. 4
VALDIS E. GARUTS
INVENTOR
BY
BUCKHORN, BLORE, KLARQUIST & SPARKMAN
ATTORNEYS

CONTINUOUSLY VARIABLE RESISTANCE ATTENUATOR USING LOSSY TRANSMISSION LINE AND HAVING CONSTANT SIGNAL TRANSIT TIME

Matter enclosed in heavy brackets [ ] appears in the original patent but forms no part of this reissue specification; matter printed in italics indicates the additions made by reissue.

This is a continuation of application Ser. No. 85,678 filed Oct. 30, 1970.

BACKGROUND OF THE INVENTION

The subject matter of the present invention relates generally to continuously variable resistance attenuators of wide band frequency response and, in particular, to such an attenuator employing a lossy distortionless transmission line with its signal conductor providing an attenuation resistance uniformly distributed along such line which is engaged by the output contact of the attenuator for movement relative to change the attenuator setting. The lossy transmission line includes a plurality of separate shunt resistors of equal value connected between the signal conductor and a ground conductor and uniformly distributed along the transmission line. The shunt resistors have a total parallel value per unit length equal to the square of the characteristic impedance divided by the resistance per unit length of the signal conductor to provide the line with a uniform characteristic impedance. A termination resistor equal to the characteristic impedance of the line is connected to the output end thereof to prevent signal reflections.

The attenuator of the present invention has a greater high frequency response than previous continuously variable resistance attenuators including that shown in U.S. Pat. No. 3,157,846 of B. O. Weinschel. In addition it has a larger attenuation range within such frequency response. The present attenuator also has the advantage that it can be employed to terminate a transmission line since the lossy transmission line forming such attenuator has a constant input impedance equal to its characteristic impedance regardless of the attenuation setting of the output contact. Furthermore, the output impedance of the attenuator at such output contact is constant and equal to one-half of the characteristic impedance under such circumstances.

One embodiment of the attenuator of the present invention employs a movable lossy transmission line section and fixed input and output contacts so that the signal transit time between such contacts does not change with adjustments in the setting of the attenuator. In addition, this enables the size of the contacts to be minimized, thereby further increasing the high frequency response due to the resulting reduction of the inductance and capacitance associated with such contacts.

The present attenuator may be employed in place of any continuously variable resistance attenuator including potentiometers. However, the present attenuator is especially useful when employed in the vertical amplifier of a cathode ray oscilloscope having a wide band frequency response from DC to several hundred megahertz.

It is, therefore, one object of the present invention to provide improved continuously variable resistance attenuator having a wider frequency band width.

Another object of the invention is to provide such an attenuator in which a distortionless lossy transmission line is employed whose signal conductor forms an attenuation resistance uniformly distributed along its length and the output contact of the attenuator engages such signal conductor for movement relative thereto, and includes a plurality of separate shunt resistors uniformly spaced along the line to provide such line with a uniform characteristic impedance.

An additional object is to provide such an attenuator whose input impedance remains constant for different attenuation settings.

A further object is to provide such an attenuator having a constant output impedance at its output contact.

Still another object of the invention is to provide such an attenuator in which the lossy transmission line section is moved while the input contact and the output contact remain fixed in order to provide a constant signal transit time between such contacts in spite of changes in the attenuator setting.

A still further object of the invention is to provide such an attenuator with an extremely compact, rugged structure by providing the movable lossy transmission line as a resistance coating on a rotor plate of insulating material surrounded by a stator plate of insulating material on which the fixed input and output contacts are provided.

BRIEF DESCRIPTION OF DRAWINGS

Other objects and advantages of the present invention will be apparent from the following detailed description of certain preferred embodiments thereof and from the attached drawings of which:

FIG. 1 is a schematic diagram of a prior art variable resistance attenuator;

FIG. 2 is a schematic diagram of one embodiment of the variable resistance attenuator of the present invention;

FIG. 3 is a schematic diagram of another embodiment of the attenuator of the present invention having fixed input and output contacts;

FIG. 4 is a plan view of an attenuator made in accordance with the embodiment of FIG. 3; and FIG. 5 is a sectional view taken along the line 5–5 of FIG. 4.

DESCRIPTION OF THE PREFERRED EMBODIMENTS

As shown in FIG. 1, prior art attenuators include a continuously variable resistance potentiometer 10 having its movable contact 12 connected to an output terminal 14. One end terminal of the potentiometer 10 is grounded while its other end terminal is connected to a signal source at the input terminal 16 of the attenuator through the signal conductor 18 of a transmission line. The transmission line includes a ground conductor 20 uniformly spaced from the signal conductor 18 to provide such line with a uniform characteristic impedance. This transmission line 18, 20 enables the signal source connected to input terminal 16 to be positioned remotely from the attenuator potentiometer 10 and such potentiometer also forms as the termination resistor for such transmission line.

The attenuator of FIG. 1 includes a series lead inductance 22 connected between one end of the potentiometer 10 and ground, and a stray capacitance 24 connected between the input end of the potentiometer 10 and movable contact 12, which both cause distortion. Thus, at high frequencies, the stray capacitor 24 shunts the signal current around the attenuation resistance 10 while the lead inductance 22 prevents the signal current from flowing to ground so that practically no attenuation of the signal is achieved at high frequencies. As a result, attenuation varies greatly with the frequency of the input signal at high frequencies and is not related to the setting of the movable contact 12 on potentiometer 10. Of course, this also prevents the attenuator from properly terminating the transmission line 18, 20 in its characteristic impedance which results in signal reflections causing distortion of the input signal.

As shown in FIG. 2, one embodiment of the present invention includes a distortionless lossy transmission line formed by a signal conductor 26 having an attenuation resistance uniformly distributed along its length, a ground conductor 28, and a plurality of separate shunt resistors 30 connected between such signal conductor and such ground conductor. The shunt resistors 30 are uniformly spaced along signal conductor 26 and of the same resistance value $[n(Z_o)^2,/R]$ where $Z_o$ is the characteristic impedance of the transmission line 26, 23, n is the number of shunt resistors per unit length of such line, and R is the resistance per unit length of the signal conductor 26. Thus, in one embodiment when $Z_o = 50$ ohms and five shunt resistors 30 were employed, a total resistance of 50 ohms was used for the signal conductor 26 to provide $R = 50/5 = 10$ ohms per unit length and the value of each shunt resistor $(Z_o)^2/R = (50)^2/10 = 250$ ohms.

The output end of the signal conductor 26 is connected through a termination resistor 32 to the ground conductor 28. Such termination resistor having a resistance equal to the characteristic impedance of the transmission line.

The input end of the attenuation resistance 26 is connected to an input terminal 34 through the signal conductor 36 of another transmission line. Thus, the signal conductor 36 is uniformly spaced from a ground conductor 38 to form a non-lossy type transmission line of uniform characteristic impedance $Z_o$, equal to the characteristic impedance of the lossy line 26, 28, 30. A movable contact 40 slides along the attenuation resistance forming the signal conductors 26 of the lossy transmission line to change the attenuator setting, and is connected to an output terminal 42. The continuously variable resistance attenuator of FIG. 2 has the advantage over the prior art attenuator of FIG. 1 that the input impedance of such attenuator is constant regardless of changes in the setting of the movable contact 40 if a high impedance is connected to output terminal 42. Thus, under such conditions the attenuator terminates the transmission line 36, 38 in its characteristic impedance at all attenuator settings. In addition, the lead inductance and stray capacitance of the attenuation element is a part of a transmission line so that they do not distort the signal traveling along such line. Therefore, the high frequency response of the attenuator is greatly increased.

The lossy transmission line of FIG. 2 may be made of any length by varying the size of the attenuation resistance of signal conduct 26, to change the attenuation range. Thus, the size of the attenuation resistance 26 does not limit the high frequency response, so that it can be made large enough to avoid any mechanical problems and to enable more accurate adjustment of the movable contact. In addition, the output impedance of the attenuator seen at output terminal 42 is constant regardless of the setting of the movable contact 40 providing that the input end 34 of the transmission line 36 and 38 is terminated in its characteristic impedance $Z_o$. The constant output impedance at output terminal 42 is then equal to $Z_o/2$.

The embodiment of FIG. 2 has two problems. First, since the distance between the movable contact 40 and the input terminal 34 of the attenuator varies with changes in the setting of such movable contact, the transit time of an input signal through such attenuator also changes. Second, a long movable contact 40 must be employed when the attenuation resistance of the signal conductor 26 is of any appreciable length and the resulting increase in the lead inductance and capacitance to ground of such movable contact limits the high frequency response of the attenuator.

The first problem may be overcome and the second problem greatly reduced by employing the embodiment of FIG. 3. In this embodiment, the lossy transmission line section is movable while the input contact and the output contact are both fixed. Since the embodiment of FIG. 3 is similar to that of FIG. 2, the same reference symbols have been employed to designate like parts and only the differences will be described. Thus, the output contact 40 is fixed and engages the attenuation resistance of the signal conductor 26 of the movable lossy transmission line section while the non-lossy transmission line 36, 38 is connected to the input terminal through a transmission line "stretcher" including a signal conductor 44 and a ground conductor 46. The signal conductor 44 and the ground conductor 46 of the "stretcher" are provided with fixed contacts 48 and 50, respectively, for engagement with signal conductor 36 and ground conductor 38 which are moved in the direction of the double headed arrow 52. Signal conductor 36 and ground conductor 38 may also be provided with sliding contacts 54 and 56, respectively, for engagement with signal conductor 44 and ground conductor 46 of the stretcher to provide good electrical contact. Thus, it can be seen that a variable length transmission line section of uniform characteristic impedance is formed by signal conductors 44 and 36 and ground conductors 46 and 38, whose length varies with the movement with the attenuator element 26. Since the distance between the input terminal 34 and the output contact 40 remains constant regardless of changes in the setting of such contact on the attenuation resistance 26, an input signal is always transmitted from input terminal 34 to output terminal 42 with the same constant transit time. In addition, since the output contact 40 is fixed, it can be made of an extremely small size, thereby reducing its series inductance and shunt capacitance to ground to a minimum and increasing the high frequency response of the attenuator.

As shown in FIGS. 4 and 5, the attenuator of FIG. 3 may be provided as coatings of resistance material and conductive material on a rotor plate 58 and a stator plate 60 of insulating material, such as aluminum oxide ceramic. The rotor plate 58 is provided with a central aperture through which a control shaft 62 extends for rotation of such rotor plate relative to the fixed stator plate 60. The rotor 58 has an arcuate resistance strip 64 coated thereon to provide the attenuation resistance of signal conductor 26 in FIG. 3. An annular conductive layer 66 of low sheet resistance is coated on the rotor in the area surrounding its central opening and radially spaced inwardly from resistive coating 64. This conductive layer 66 forms the ground conductors 28 and 38 of FIG. 3. Five radially spaced resistance areas 68 are coated on the rotor plate 58 extending like spokes between coatings 66 and 64, such resistance areas corresponding to shunt resistors 30 of FIG. 3. The attenuation resistance 64 has a value of 50 ohms uniformly distributed along the length of such layer. The shunt resistors 68 are uniformly spaced along the attenuation resistance 64 and have substantially the same value of, for example, 250 ohms each when five shunt resistors are employed. A resistance area 70 equal to the 50 ohms characteristic impedance of the lossy transmission line and corresponding to the termination resistor 32 of FIG. 3, is coated on the rotor member 58 extending radially between the end of layer 64 and 66. The number of shunt resistors 30 of FIGS. 2 and 3 and resistive areas 68 of FIG. 4 can be increased if their resistance is also increased to provide the same characteristic impedance. For example with ten shunt resistors, the attenuation resistance per unit length $R = 50/10 = 5$ and the shunt resistance $R_s$, is given by [ $R_2$ ] $R_s = (Z_o)^2/R = (50)^2/5 = 2{,}500/5 = 500$ ohms.

The conductive layer 66 is connected to a ground plane coating 72 on the back side of the stator through a conductive layer 74 on the inner surface of the central aperture of the stator member as shown in FIG. 5. A spring contact member 76 is fixedly attached at one end to a conductive strip 78 on the stator member 60. The spring contact 76 corresponds to output contact 40 of FIG. 3 and its free end engages the resistive layer 64 for sliding movement thereon during rotation of the rotor member 58.

An arcuate conductive strip 80 is coated on the rotor plate 58 with one end overlapping the input end of the resistance layer 64. This conductive strip 80 functions as the signal conductor 36 of FIG. 3, while the grounded conductive layer 66 functions as the ground conductor 38 of the non-lossy transmission line. An arcuate spring member 82 corresponding to signal conductor 44 of FIG. 3 is fixedly attached at one end to a conductive strip 84 on the stator member 60. Of course the conductive layer 66 provides the ground conductor 46 of FIG. 3 and in combination with the spring member 82 forms the "stretcher" transmission line section. The spring member 82 has the same radius of curvature as the conductive strip 80 and is positioned to overlap conductive area 80 with its free end in engagement therewith for sliding contact during rotation of the rotor member 58. As shown in FIG. 5, a contact pressure plate 86 of insulating material such as aluminum oxide ceramic or the acetal resin plastic sold under the trademark "DELRIN," is positioned on the opposite side of the spring member 82 and is provided with an arcuate notch 88 containing such spring member. The pressure plate 86 holds the spring member 82 in contact with the conductive area 80 during rotation of the rotor 58 as shown in FIG. 5. It should be noted that the pressure plate 86 has been broken away from FIG. 4 for purposes of clarity, and the rotation of rotor 58 is limited to an angle of about 90° by suitable stops (not shown).

The ground plane coating 72 on the rotor 58 is connected to a similar ground plane 90 formed by a coating of conductive material on the stator through a plurality of spring contacts 92 as shown in FIG. 5. The stator ground plane 90 is electrically connected to ground through a fixed connection 93.

It will be obviously to those having ordinary skill in the art that many changes may be made in the above described preferred embodiment of the present invention without departing from the spirit of the invention. Thus, the input and output terminals can be reversed and a signal source connected to the input terminal 42 through a non-lossy transmission line (not shown) having a uniform characteristic impedance equal to one half the characteristic impedance of the lossy line 26, 28. Therefore, the scope of the present invention should only be determined by the following claims.

I claim:

1. A variable resistance attenuator of wide frequency bandwidth comprising:

first transmission line means of substantially uniform characteristic impedance including a signal conductor and a ground conductor forming a lossy transmission line, said signal conductor being of resistance material to provide an attenuation resistance distributed substantially uniformly along the length of said signal conductor, and a plurality of separate shunt resistors of substantially the same resistance connected between said signal conductor and said ground conductor and spaced substantially uniformly along the length of said signal conductor;

first signal coupling means connected to one end of said signal conductor through a first connection;

second signal coupling means connected to said signal conductor through a second connection;

control means for moving said second connection along the attenuation resistance of said signal conductor to vary the attenuation setting; said control means moving the first transmission line means to change the attenuator setting of said second connection while maintaining the same electrical signal path length between said first connection and said second connection.

2. An attenuator in accordance with claim 1 in which the second connection includes a fixed contact engaging the attenuation resistance and the first connection includes another fixed contact coupled to said one end of said first line, said first transmission line means being moved relative to said fixed contacts to change the attentuator setting so that the distance between said fixed contacts remains the same for different attenuator settings.

3. An attenuator in accordance with claim 2 in which the first signal coupling means includes a second transmission line of substantially uniform characteristic impedance equal to that of said first transmission line means, and including a signal conductor and a ground conductor insulated from each other to provide a non-lossy second line and connected, respectively, to the signal conductor and the ground conductor of the first transmission line.

4. An attenuator in accordance with claim 3 in which the second transmission line is formed in two separate sections joined by said first connection, one of said sections being fixed in position and the other of said sections being attached to the first transmission line for movement therewith to change the length of said second line.

5. An attenuator in accordance with claim 4 in which said one section of said second line has its signal conductor forming the fixed contact of said first connection which is in engagement with the signal conductor of said other section of said second line.

6. An attenuator in accordance with claim 2 in which the first transmission line means is formed by a rotor member of insulating material with the signal conductor forming said attenuation resistance, the ground conductor, and said shunt resistors provided as layers on said rotor member, and in which the fixed contacts are provided on a stator member of insulating material and connected to separate conductive regions on said stator member so that rotation of said rotor member causes the second connection to move along the attenuation resistance of the signal conductor layer.

7. An attenuator in accordance with claim 6 in which the first signal coupling means includes a second transmission line of non-lossy type having a substantially uniform characteristic impedance equal to that of the first transmission line means and formed of two separate sections including one section provided on the stator member and another section provided on the rotor member, said one section having a signal conductor forming the fixed contact of said first connection which engages the signal conductor of the other section.

8. An attenuator in accordance with claim 7 in which the signal conductor of said other section is provided by a conductive layer of said rotor connected to said one end of the first transmission line means for movement therewith on the rotor member.

9. An attenuator in accordance with claim 6 in which the rotor member is an annular plate mounted in a hole in another plate forming the stator member, and the shunt resistor layers extend radially outward from the ground conductor layer to the signal conductor layer which are coated on the same side of said rotor plate.

10. An attenuator in accordance with claim 7 which also includes a termination resistor equal to said characteristic impedance provided as a layer on the stator plate between the other end of the signal conductor and the ground conductor.

11. A variable resistance attenuator of wide frequency bandwidth comprising:

first transmission line means of substantially uniform characteristic impedance including signal conductor means and ground conductor means forming a lossy transmission line, said signal conductor means being of resistance material to provide an attenuation resistance distributed along a length of said signal conductor means and separate shunt conductance means connected between said signal conductor means and said ground conductor means and distributed along the length of said signal conductor means in proportion to said attenuation resistance;

first signal coupling means connected to one end of said signal conductor means through first connection means;

second signal coupling means connected to said signal conductor means through second connection means;

control means for moving said second connection means along said attenuation resistance of said signal conductor means to vary the attenuation setting, said control means moving said first transmission line means to change the attenuator setting of said second connection means while maintaining the same electrical signal path between said first connection means and said second connection means.

12. A variable resistance attenuator according to claim 11 wherein said separate shunt conductance means comprises a plurality of separate shunt resistance means.

13. A variable resistance attenuator of wide frequency bandwidth comprising:

first transmission line means of substantially uniform characteristic impedance including first signal conductor means and first ground conductor means defining a lossy transmission line, said signal conductor means being of resistance material to provide an attenuation resistance distributed along a length of said signal conductor means and separate shunt conductance means connected between said signal conductor means and said ground conductor means and distributed along the length of said signal conductor means in proportion to said attenuation resistance;

second transmission line means of substantially uniform characteristic impedance equal to that of said first transmission line means and including second signal conductor means and second ground conductor means defining a non-lossy transmission line; first signal coupling means including first connection means connecting said first signal coupling means to said first signal conductor means;

second signal coupling means including second connection means connecting said second signal coupling means to said second signal conductor means; and control means for moving said first and second transmission line means relative to one another to change the attenuator setting of said first connection means while maintaining the same electrical signal path length between said first and second connection means.

14. A variable resistance attenuator according to claim 13 wherein said second signal coupling means defines third transmission line means including third signal conductor means connected to said first signal conductor means and third ground conductor means connected to said first ground conductor means defining another non-lossy transmission line.

15. A variable resistance attenuator according to claim 14 wherein said separate shunt conductance means comprises a plurality of separate shunt resistance means.

*16. A variable resistance attenuator, comprising:*

*transmission line means of substantially uniform characteristic impedance including signal conductor and ground conductor means disposed on a support member and forming a lossy transmission line, said signal conductor means having resistance film material to provide an attenuation resistance distributed along a length of said signal conductor means and defining series resistance means and including shunt resistance means extending away from said series resistance means to provide electrical connection to said ground conductor means;*

*means coupled between said transmission line means and an input connector device for electrically connecting said transmission lines means and said input connector device together;*

*means coupled between said transmission line means and an output connector device for electrically connecting said transmission line means and said output connector device together; and*

*means for moving both said means and said support member relative to one another to change the attenuation value of the attenuator while maintaining the same electrical path length between both said connector devices.*

* * * * *